(12) United States Patent
Reinhart et al.

(10) Patent No.: US 11,572,152 B2
(45) Date of Patent: Feb. 7, 2023

(54) STRUCTURAL COMPOSITE AIRFOILS WITH A SINGLE SPAR, AND RELATED METHODS

(71) Applicant: The Boeing Company, Chicago, IL (US)

(72) Inventors: Donald Drew Reinhart, Snohomish, WA (US); Ross Westermeier, Seattle, WA (US); Bryan Gruner, Bellevue, WA (US); Jan A. Kordel, Redmond, WA (US)

(73) Assignee: The Boeing Company, Chicago, IL (US)

( * ) Notice: Subject to any disclaimer, the term of this patent is extended or adjusted under 35 U.S.C. 154(b) by 151 days.

(21) Appl. No.: 16/880,044

(22) Filed: May 21, 2020

(65) Prior Publication Data

US 2021/0362829 A1  Nov. 25, 2021

(51) Int. Cl.
*B64C 9/00* (2006.01)
*B64F 5/10* (2017.01)
(Continued)

(52) U.S. Cl.
CPC ............... *B64C 9/00* (2013.01); *B64C 3/185* (2013.01); *B64C 3/20* (2013.01); *B64C 3/26* (2013.01); *B64C 9/16* (2013.01); *B64F 5/10* (2017.01)

(58) Field of Classification Search
CPC .. B64C 3/18; B64C 3/185; B64C 3/20; B64C 3/26
See application file for complete search history.

(56) References Cited

U.S. PATENT DOCUMENTS 1,803,030 A   7/1929  Messerschmitt
1,875,593 A   9/1932  Hall
(Continued)

FOREIGN PATENT DOCUMENTS

BR   102017007099 A2   10/2017
CA       3000916 A1    12/2018
(Continued)

OTHER PUBLICATIONS

English language machine translation of German Patent Application Publication No. DE3726909A1, published Feb. 23, 1989.
(Continued)

*Primary Examiner* — Nicholas McFall
*Assistant Examiner* — Eric Acosta
(74) *Attorney, Agent, or Firm* — Kolitch Romano Dascenzo Gates LLC

(57) ABSTRACT

Structural composite airfoils include a primary structural element and a secondary structural element defining the trailing edge of the structural composite airfoil. The primary structural element includes an upper skin panel, a lower skin panel, and a middle C-channel spar that is coupled to the upper skin panel and the lower skin panel. The upper skin panel extends from an upper leading edge end to an upper trailing edge end, and the lower skin panel extends from a lower leading edge end to a lower trailing edge end. The lower leading edge end of the lower skin panel is coupled to the upper leading edge end of the upper skin panel within the leading edge region of the primary structural element.

20 Claims, 5 Drawing Sheets

(51) Int. Cl.
*B64C 3/26* (2006.01)
*B64C 3/18* (2006.01)
*B64C 3/20* (2006.01)
*B64C 9/16* (2006.01)

(56) References Cited

U.S. PATENT DOCUMENTS

| | | | |
|---|---|---|---|
| 3,167,129 | A | 1/1965 | Shultz |
| 3,333,642 | A | 8/1967 | Kee |
| 3,910,531 | A | 10/1975 | Leomand |
| 3,994,452 | A | 11/1976 | Cole |
| 5,843,355 | A | 12/1998 | McCarville et al. |
| 6,375,120 | B1 * | 4/2002 | Wolnek ............... B64C 3/20 244/119 |
| 7,393,183 | B2 | 7/2008 | Keller |
| 8,684,309 | B2 | 4/2014 | Wildman |
| 8,853,313 | B2 | 10/2014 | Miller |
| 9,522,504 | B2 | 12/2016 | Garcia Martin et al. |
| 9,656,738 | B2 | 5/2017 | Murta et al. |
| 9,745,048 | B2 | 8/2017 | Wood |
| 10,173,789 | B2 | 1/2019 | Rodman |
| 10,228,005 | B2 | 3/2019 | Wilson et al. |
| 10,532,804 | B2 | 1/2020 | Santini |
| 2005/0227582 | A1 | 10/2005 | Kloos |
| 2005/0238491 | A1 | 10/2005 | Morrison et al. |
| 2008/0258008 | A1 | 10/2008 | Cooper |
| 2010/0308170 | A1 | 12/2010 | Hadley et al. |
| 2015/0353185 | A1 | 12/2015 | Petiot et al. |
| 2016/0244143 | A1 | 8/2016 | Foster et al. |
| 2018/0043639 | A1 | 2/2018 | Autry et al. |
| 2018/0057142 | A1 | 3/2018 | Wilkerson |
| 2018/0086429 | A1 | 3/2018 | Sheppard |
| 2018/0127080 | A1 | 5/2018 | Tyler et al. |
| 2018/0155004 | A1 | 6/2018 | Woolcock |
| 2018/0222571 | A1 * | 8/2018 | Santini ............... B64C 9/02 |
| 2018/0346094 | A1 | 12/2018 | Deck et al. |
| 2019/0061901 | A1 | 2/2019 | Long |

FOREIGN PATENT DOCUMENTS

| | | | |
|---|---|---|---|
| DE | 3726909 A1 | 2/1989 | |
| EP | 1176089 | 1/2002 | |
| EP | 3360778 | 8/2018 | |
| EP | 3409580 | 12/2018 | |
| GB | 2266085 A * | 10/1993 | ............... B64C 3/20 |
| WO | WO 2014/170690 | 10/2014 | |

OTHER PUBLICATIONS

English language machine translation of Brazilian Patent Application Publication No. BR102017007099-A2, published Oct. 10, 2017.

* cited by examiner

STRUCTURAL COMPOSITE AIRFOILS WITH A SINGLE SPAR, AND RELATED METHODS

FIELD

The present disclosure relates generally to structural composite airfoils and related methods.

BACKGROUND

Aircraft, including fixed-wing aircraft and rotary-wing aircraft, employ a variety of aerodynamic control surfaces, such as ailerons, air brakes, elevators, flaps, rudders, slats, spoilers and the like. By manipulating one or more of the aerodynamic control surfaces, a pilot may control the lift generated by the aircraft, such as during takeoff, climbing, descending and landing, as well as the aircraft's orientation about its pitch, roll, and yaw axes. For example, the trailing edge of a wing of a fixed-wing aircraft typically includes one or more flaps, with the flaps being moveable between retracted and extended positions. At cruise, the flaps are typically maintained in a retracted position. When extended, the flaps increase the camber of the wing. Therefore, during takeoff, climbing, descending, or landing, the flaps may be extended, either partially or fully, to increase the maximum lift coefficient and effectively reduce the stalling speed of the aircraft. Said aerodynamic control surfaces are typically airfoils formed of composite materials, and thus are referred to herein as structural composite airfoils.

Structural composite airfoils, such as flaps, have an aerodynamic cross-sectional profile that is typically formed by connecting an upper skin to a lower skin proximate both the leading edge and the trailing edge of the structural composite airfoil. In conventional construction of inboard and outboard flaps, for example, a primary structural element of the flap is defined by the upper and lower skins being coupled to three spars that extend the width of the flap. The leading edge of the structural composite airfoil (which typically includes a bullnose shape), and the trailing edge (which is tapered to a thin cross-section) are typically outside of the primary structural element, forming respective secondary structural elements of the flap. Various fasteners and components (e.g., splice straps and/or nut plates) are used to secure the upper and lower skins to the spars and other structures that form the flap. Large numbers of fasteners can increase costs, manufacturing cycle time, and weight of the resulting assemblies. Accordingly, those skilled in the art continue research and development efforts directed to improving structural composite airfoils and the manufacturing thereof.

SUMMARY

Structural composite airfoils and related methods of forming said structural composite airfoils as disclosed herein may reduce fastener counts, improve airfoil aerodynamic surfaces, and/or simplify manufacturing processes for structural composite airfoils.

An example of a structural composite airfoil according to the present disclosure includes a primary structural element and a secondary structural element defining a trailing edge of the structural composite airfoil. The structural composite airfoil has a leading edge and a trailing edge, and the primary structural element extends from a leading edge region to a trailing edge region. The leading edge region of the primary structural element forms the leading edge of the structural composite airfoil.

The primary structural element includes an upper skin panel, a lower skin panel, and a middle C-channel spar. An internal volume is defined between the upper skin panel and the lower skin panel. The middle C-channel spar includes an upper flange coupled to the upper skin panel, and a lower flange coupled to the lower skin panel. The upper skin panel extends from an upper leading edge end to an upper trailing edge end, and the lower skin panel extends from a lower leading edge end to a lower trailing edge end. The lower leading edge end of the lower skin panel is coupled to the upper leading edge end of the upper skin panel within the leading edge region of the primary structural element.

Methods of assembling such structural composite airfoils are also disclosed. In such methods, the upper skin panel is coupled to the upper flange of the middle C-channel spar, the lower skin panel is coupled to the middle C-channel spar such that the internal volume is defined between the upper skin panel and the lower skin panel, and the lower leading edge end of the lower skin panel is coupled to the upper leading edge end of the upper skin panel to form the leading edge of the structural composite airfoil.

DESCRIPTION

Figure 1:
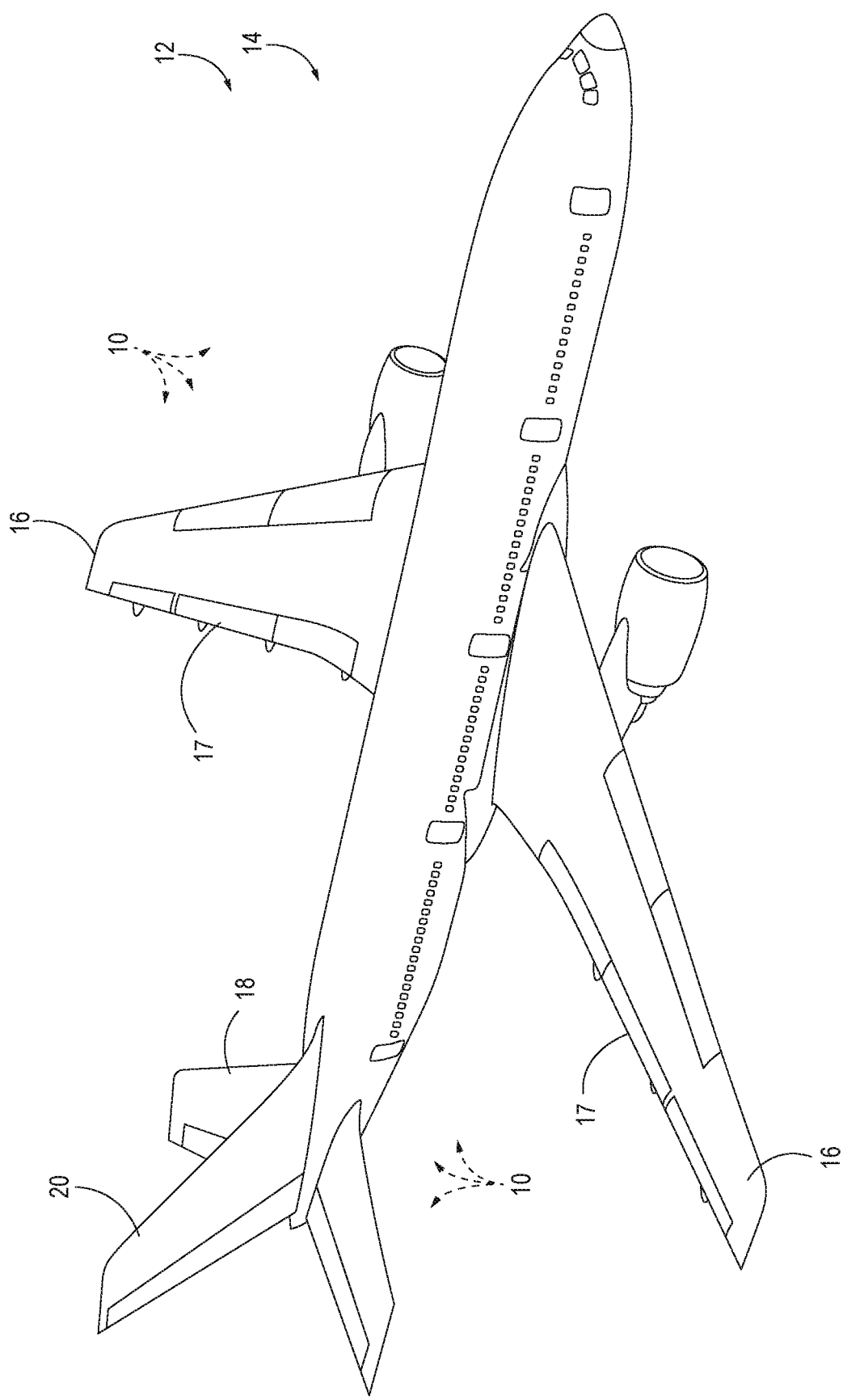
FIG. 1 is a schematic representation of an apparatus that may include one or more structural composite airfoils according to the present disclosure.

With reference to FIG. 1, one or more structural composite airfoils 10 may be included in an apparatus 12. Structural composite airfoils 10 may be utilized in many different industries and applications, such as the aerospace, automotive, military, architecture, wind power generation, remote control aircraft, marine, recreation, and/or motorsport industries. In FIG. 1, an example of apparatus 12 that may include one or more structural composite airfoils 10 generally is illustrated in the form of an aircraft 14. Aircraft 14 may take any suitable form, including commercial aircraft, military aircraft, or any other suitable aircraft. While FIG. 1 illustrates aircraft 14 in the form of a fixed-wing aircraft, other types and configurations of aircraft are within the scope of aircraft 14 according to the present disclosure, including (but not limited to) rotorcraft and helicopters.

Apparatus 12 (e.g., aircraft 14) may include one or more structural composite airfoils 10. As illustrative, non-exclusive examples, structural composite airfoils 10 may be utilized in wings 16 (e.g., flaps 17, which may be inboard or outboard flaps), though other components of aircraft 14, such as horizontal stabilizers 18, vertical stabilizers 20, and other components additionally or alternatively may include one or more structural composite airfoils 10. Other applications in aircraft 14 (or other apparatus 12) for structural composite airfoils 10 may include other wing control surfaces, ailerons, flaperons, air brakes, elevators, slats, spoilers, canards, rudders, and/or winglets. In other industries, examples of apparatus 12 including one or more structural composite airfoils 10 may include or be a portion of space satellites, transit vehicles, shipping containers, rapid transit vehicles, automobile bodies, propeller blades, turbine blades, and/or marine vehicles, among others.

Figure 2:
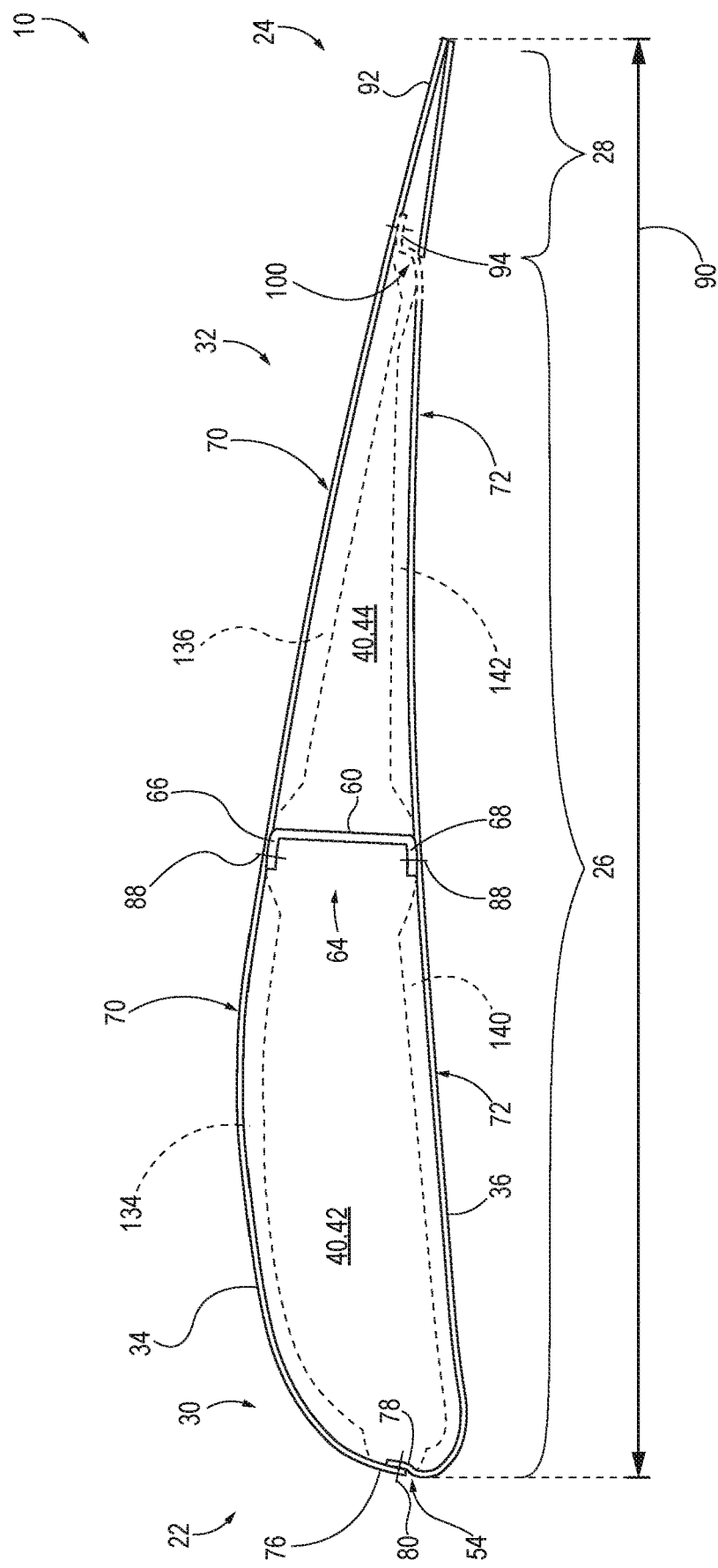
FIG. 2 is a schematic, side elevation representation of examples of structural composite airfoils according to the present disclosure.

FIG. 2 provides illustrative, non-exclusive examples of structural composite airfoils 10 according to the present disclosure. In general, elements that are likely to be included are illustrated in solid lines, while elements that are optional are illustrated in dashed lines. However, elements that are shown in solid lines are not essential to all examples, and an element shown in solid lines may be omitted from a particular example without departing from the scope of the present disclosure.

Structural composite airfoil 10 has a leading edge 22 and a trailing edge 24, and generally includes a primary structural element 26 and a secondary structural element 28. As used herein, a "primary structural element" is an element or structure which carries flight, ground, or pressurization loads, and whose failure would reduce the structural integrity of the apparatus or assembly of which structural composite airfoil 10 is a part. As used herein, a "secondary structural element" is an element or structure whose failure does not affect the safety of the apparatus or assembly of which structural composite airfoil 10 is a part.

Primary structural element 26 extends from a leading edge region 30 to a trailing edge region 32. As shown in FIG. 2, leading edge region 30 forms, or defines, leading edge 22 of structural composite airfoil 10. Leading edge region 30 may be said to be the region of primary structural element 26 that is closest to leading edge 22. Similarly, trailing edge region 32 may be said to be the region of primary structural element 26 that is closest to trailing edge 24, though trailing edge region 32 of primary structural element 26 may not define trailing edge 24 of structural composite airfoil 10. As used herein, a first element or structure is said to be "aft" of another element or structure if the first element or structure is positioned closer to trailing edge 24 than is the other element or structure. Similarly, as used herein, a first element or structure is said to be "forward" of another element or structure if the first element or structure is positioned closer to leading edge 22 than is the other element or structure.

Primary structural element 26 includes at least an upper skin panel 34, a lower skin panel 36, and a middle C-channel spar 60. Middle C-channel spar 60 may be arranged such that a channel 64 faces leading edge 22, as shown in FIG. 2, though in other examples, middle C-channel spar 60 may be arranged such that channel 64 faces trailing edge 24. An internal volume 40 is defined between upper skin panel 34 and lower skin panel 36. Middle C-channel spar 60 includes an upper flange 66 and a lower flange 68, with upper flange 66 being coupled to upper skin panel 34, and lower flange 68 being coupled to lower skin panel 36. Upper skin panel 34 generally extends from an upper leading edge end 76 to an upper trailing edge end 92. Upper leading edge end 76 corresponds to the end of upper skin panel 34 that is closest to leading edge 22 of structural composite airfoil 10, and upper trailing edge end 92 corresponds to the end of upper skin panel 34 that is closest to trailing edge 24 of structural composite airfoil 10. Upper skin panel 34 may be continuous from upper leading edge end 76 to upper trailing edge end 92. Similarly, lower skin panel 36 generally extends from a lower leading edge end 78 to a lower trailing edge end 94. Lower leading edge end 78 corresponds to the end of lower skin panel 36 that is closest to leading edge 22, and lower trailing edge end 94 corresponds to the end of lower skin panel 36 that is closest to trailing edge 24. Lower skin panel 36 may be continuous from lower leading edge end 78 to lower trailing edge end 94.

Leading edge 22 of structural composite airfoil 10 may be generally shaped to have a bullnose shape. Lower leading edge end 78 of lower skin panel 36 is coupled to upper leading edge end 76 of upper skin panel 34 forward of middle C-channel spar 60 and within leading edge region 30 of primary structural element 26. The attachment point of upper leading edge end 76 and lower leading edge end 78 may define the forward-most point of primary structural element 26 and may also define leading edge 22. In some examples, upper leading edge end 76 may overlap with lower leading edge end 78 where the two are coupled. In other words, upper skin panel 34 may overlap and thereby engage with lower skin panel 36 adjacent upper leading edge end 76 and lower leading edge end 78. In the example shown in FIG. 2, upper skin panel 34 and lower skin panel 36 are arranged such that upper leading edge end 76 is forward of lower leading edge end 78 at the point where the two overlap, though in other examples, lower leading edge end 78 may be forward of upper leading edge end 76 where they overlap and are coupled together. The location of the interface between upper leading edge end 76 and lower leading edge end 78 may be varied higher or lower of leading edge 22, depending on loft and/or other desired characteristics of structural composite airfoil 10. For example, upper skin panel 34 may be shortened and lower skin panel 36 may be lengthened such that the two overlap higher up on leading edge 22. In other examples, upper skin panel 34 may be lengthened and lower skin panel 36 may be shortened such that the two overlap lower down on leading edge 22.

Lower leading edge end 78 includes a lower panel joggle 54 to receive and engage with upper leading edge end 76 in FIG. 2, though in other examples of structural composite airfoil 10, upper leading edge end 76 may include an upper panel joggle similar to lower panel joggle 54 to receive and engage with lower leading edge end 78. Lower panel joggle 54 (or an upper panel joggle) may be configured to facilitate coupling of upper skin panel 34 and lower skin panel 36 without needing a splice strap to couple the panels 34, 36. In some examples, structural composite airfoil 10 includes a sealant, filler material, and/or resin that is configured to smooth leading edge 22 where upper leading edge end 76 is coupled to lower leading edge end 78. A leading edge fastener 80 may be used to coupled upper leading edge end 76 to lower leading edge end 78. Leading edge fastener 80 may be countersunk in upper leading edge end 76 such that it is at least substantially flush with upper skin panel 34. Additionally or alternatively, leading edge fastener 80 may be countersunk in lower leading edge end 78 such that it is at least substantially flush with lower skin panel 36.

As shown in FIG. 2, structural composite airfoils 10 may be provided without any C-channel spar within in leading edge region 30 of primary structural element 26, which can provide a cost and/or weight savings for structural composite airfoil 10, though structural composite airfoils 10 having a discrete front C-channel spar are also within the scope of the present disclosure. Instead of a discrete front C-channel spar component coupled to upper skin panel 34 and lower skin panel 36 near leading edge 22, structural composite airfoil 10 may be strengthened within leading edge region 30. Specifically, materials and panel configurations of upper skin panel 34 and lower skin panel 36 may be configured to strengthen leading edge 22 as well as provide the bullnose shape of leading edge 22.

For example, each of upper skin panel 34 and lower skin panel 36 may be a composite panel formed of a plurality of layers (plies) of a fiber-reinforced polymer that are laminated together. For example, upper skin panel 34 and lower skin panel 36 may be formed of carbon fiber reinforced polymer material or fiberglass reinforced polymer material. In other examples, upper skin panel 34 and/or lower skin panel 36 may be a metallic material, a polymer, or other suitable material. At least a portion of upper skin panel 34 may be core stiffened (e.g., at least a portion of upper skin panel 34 may be formed of a core stiffened material). As used herein, "core stiffened" refers to skin panels having at least a first skin and a low-density core material coupled to the skin. Core stiffened materials optionally include a second skin, with the core material sandwiched between the first and second skins to form a sandwich panel. Suitable materials for forming core stiffened portions are well known in the art, and include honeycomb core materials and metallic core materials, though other core materials are within the scope of the present disclosure. As an illustrative example, upper skin panel 34 may include a first upper core stiffened portion 134 and a second upper core stiffened portion 136. First upper core stiffened portion 134 may be positioned such that it extends between leading edge 22 and middle C-channel spar 60, and second upper core stiffened portion 136 may be positioned such that it extends between middle C-channel spar 60 and an integral Z-spar 100 or upper trailing edge end 92. One or more of upper core stiffened portions 134, 136 may be tapered, such as in areas of the respective portion near middle C-channel spar 60 and/or integral Z-spar 100. For example, upper core stiffened portion 134 and/or 136 may have a height or thickness extending away from upper skin panel 34 towards lower skin panel 36, with said height or thickness decreasing in the vicinity of one or more of leading edge 22, middle C-channel spar 60, and/or integral Z-spar 100, thereby forming the taper. In the example of FIG. 2, the thickness of first upper core stiffened portion 134 is tapered adjacent leading edge 22 (e.g., adjacent upper leading edge end 76 of upper skin panel 34) and adjacent middle C-channel spar 60, and the thickness of second upper core stiffened portion 136 is tapered adjacent middle C-channel spar 60 and integral Z-spar 100. In other examples, the height or thickness of upper core stiffened portion 134 and/or 136 may be substantially constant, rather than tapering where the respective upper core stiffened portion 134 and/or 136 meets leading edge 22 or the respective spar 60 and/or 100. In some examples, upper core stiffened portion 134 and/or 136 may abut a respective spar 60 and/or 100.

While upper skin panel 34 as shown in FIG. 2 includes two distinct upper core stiffened portions 134, 136, in other examples, upper skin panel 34 may be core stiffened along its entire length, along a greater or lesser portion of its length, and/or may include more or fewer discrete upper core stiffened portions than is shown in FIG. 2. Additionally or alternatively, each respective upper core stiffened portion 134, 136 may extend to a greater or lesser extent than is shown in FIG. 2. In some examples, first upper core stiffened portion 134 extends forward to a point on leading edge 22 that is adjacent upper leading edge end 76. In this manner, first upper core stiffened portion 134 may be configured to at least partially define the shape of leading edge 22. In some examples, first upper core stiffened portion 134 may extend all the way to upper leading edge end 76. In some examples, first upper core stiffened portion 134 extends towards upper leading edge end 76 to or near the point where upper skin panel 34 overlaps lower skin panel 36 at leading edge 22.

Additionally or alternatively, at least a portion of lower skin panel 36 may be core stiffened (e.g., at least a portion of lower skin panel 36 may be formed of a core stiffened material). As an illustrative example, lower skin panel 36 includes a first lower core stiffened portion 140 and a second lower core stiffened portion 142. First lower core stiffened portion 140 may be positioned such that it extends between leading edge 22 and middle C-channel spar 60, and second lower core stiffened portion 142 may be positioned such that it extends between middle C-channel spar 60 and integral Z-spar 100 or lower trailing edge end 94. One or more of lower core stiffened portions 140, 142 may be tapered, such as in areas of the respective portion near middle C-channel spar 60 and/or integral Z-spar 100. For example, lower core stiffened portion 140 and/or 142 may have a height or thickness extending away from lower skin panel 36 towards upper skin panel 34, with said height or thickness decreasing in the vicinity of one or more of leading edge 22, middle C-channel spar 60, and/or integral Z-spar 100, thereby forming the taper. In the example of FIG. 2, the thickness of first lower core stiffened portion 140 is tapered adjacent leading edge 22 (e.g., adjacent lower leading edge end 78 of lower skin panel 36) and adjacent middle C-channel spar 60, and the thickness of second lower core stiffened portion 142 is tapered adjacent middle C-channel spar 60 and integral Z-spar 100. In other examples, the height or thickness of lower core stiffened portion 140 and/or 142 may be substantially constant, rather than tapering where the respective lower core stiffened portion 140 and/or 142 meets leading edge 22 and/or the respective spar 60 and/or 100. In some examples, one or more of lower core stiffened portions 140, 142, and/or 144 may abut middle C-channel spar 60 and/or integral Z-spar 100.

While lower skin panel 36 as shown in FIG. 2 includes two distinct lower core stiffened portions 140, 142, in other examples, lower skin panel 36 may be core stiffened along its entire length, may be core stiffened along a greater or lesser portion of its length, and/or may include more or fewer discrete lower core stiffened portions than is shown in FIG. 2. Additionally or alternatively, each respective lower core stiffened portion 140, 142 may extend to a greater or lesser extent than is shown in FIG. 2. In some examples, first lower core stiffened portion 140 extends forward to a point on leading edge 22 that is adjacent lower leading edge end 78. In this manner, first lower core stiffened portion 140 may be configured to at least partially define the shape of leading edge 22. In some examples, first lower core stiffened portion 140 may extend all the way to lower leading edge end 78. In some examples, first lower core stiffened portion 140 extends towards lower leading edge end 78 to or near the point where upper skin panel 34 overlaps lower skin panel 36 at leading edge 22.

Structural composite airfoil 10 may be described in terms of an upper airfoil surface 70 and a lower airfoil surface 72. Upper airfoil surface 70 is at least partially defined by upper skin panel 34, while lower airfoil surface 72 is at least partially defined by lower skin panel 36. In some examples, upper airfoil surface 70 and/or lower airfoil surface 72 may be at least partially defined by secondary structural element 28. For example, in the example shown in FIG. 2, a portion of lower airfoil surface 72 adjacent trailing edge 24 is defined by secondary structural element 28, while the entire upper airfoil surface 70 is defined by upper skin panel 34, though other arrangements are also within the scope of the present disclosure. The location of lower panel joggle 54 may be positioned at a different location than is shown in FIG. 2, such that upper airfoil surface 70 is at least partially defined by lower skin panel 36, by virtue of lower skin panel 36 wrapping up further such that it passes the midpoint of leading edge 22 and thus forms part of upper airfoil surface 70. Similarly, in examples of structural composite airfoil having an upper panel joggle in upper skin panel 34, the upper panel joggle may be positioned such that lower airfoil surface 72 is at least partially defined by upper skin panel 34, by virtue of upper skin panel 34 wrapping further down such that it passes the midpoint of leading edge 22 and thus forms part of lower airfoil surface 72.

Trailing edge 24 of structural composite airfoil 10 is defined by secondary structural element 28. In various examples of structural composite airfoil 10, secondary structural element 28 may include a wedge closeout, a duckbill closeout, a bonded closeout, and/or a riveted closeout. Examples of suitable trailing edge closeouts are also disclosed in U.S. Pat. No. 10,532,804, issued on Jan. 14, 2020, and titled AERODYNAMIC CONTROL SURFACE AND ASSOCIATED TRAILING EDGE CLOSE-OUT METHOD, the entire disclosure of which is hereby incorporated by reference herein in its entirety for all purposes. In some examples, upper trailing edge end 92 may be coupled to lower trailing edge end 94. Additionally or alternatively, upper trailing edge end 92 and/or lower trailing edge end 94 may form or define trailing edge 24 of structural composite airfoil 10.

Examples of presently disclosed structural composite airfoils 10 may be configured for interfacing between components or elements (e.g., interfacing upper leading edge end 76 and lower leading edge end 78) without utilizing splice straps, and/or may allow for a part count reduction by reducing or eliminating the number of splice straps, nut plates, and/or other fasteners used in assembling structural composite airfoils 10. However, structural composite airfoil 10 may include one or more fasteners securing various components to each other. For example, a single leading edge fastener 80 may couple upper skin panel 34 and lower skin panel 36 (e.g., upper leading edge end 76 and lower leading edge end 78). In some examples, leading edge fastener 80 may be a plurality of leading edge fasteners 80 spaced apart along the width of structural composite airfoil 10 (the width of the airfoil extending into/out of the page) to secure lower skin panel 36 to upper skin panel 34 and lower skin panel 36 along leading edge 22. One or more other fasteners 88 may be used to secure various components of structural composite airfoil 10, such as to secure upper skin panel 34 to upper flange 66 of middle C-channel spar 60 and/or to secure lower skin panel 36 to lower flange 68 of middle C-channel spar 60. Additionally or alternatively, one or more fasteners 88 may be used to couple upper trailing edge end 92 to lower trailing edge end 94 and/or to couple secondary structural element 28 to upper trailing edge end 92 and/or lower trailing edge end 94.

Middle C-channel spar 60 may form part of primary structural element 26. In the example shown in FIG. 2, primary structural element 26 is defined by leading edge 22 formed by upper skin panel 34 and lower skin panel 36, middle C-channel spar 60, integral Z-spar 100, and the respective portions of upper skin panel 34 and lower skin panel 36 extending between leading edge 22 and integral Z-spar 100. In other examples of structural composite airfoil 10, primary structural element 26 may extend further aft towards trailing edge 24 than is illustrated in FIG. 2.

Structural composite airfoil 10 has a length 90, which may also be referred to herein as a chord length 90, and a position along length 90 may be defined in terms of a percentage of a distance along length 90 from leading edge 22. In these terms, integral Z-spar 100 may be positioned between 80%-95% of length 90 away from leading edge 22. Additionally or alternatively, middle C-channel spar 60 may be positioned between 30%-60% of length 90 away from leading edge 22, such as at about 40% of length 90 away from leading edge 22. Additionally or alternatively, middle C-channel spar 60 may be positioned between 35-45% of chord length 90 away from leading edge 22. In some examples, middle C-channel spar 60 may be positioned for balancing torsional capability within primary structural element 26 on either side of middle C-channel spar 60. For example, middle C-channel spar 60 may effectively separate internal volume 40 into a forward internal volume 42 and an aft internal volume 44, with forward internal volume 42 being forward of middle C-channel spar 60 and aft internal volume 44 being aft of middle C-channel spar 60. In some examples, the volume of forward internal volume 42 is within 10% of the volume of aft internal volume 44. In some examples, the volume of forward internal volume 42 is at least approximately equal to the volume of aft internal volume 44.

Figure 3:
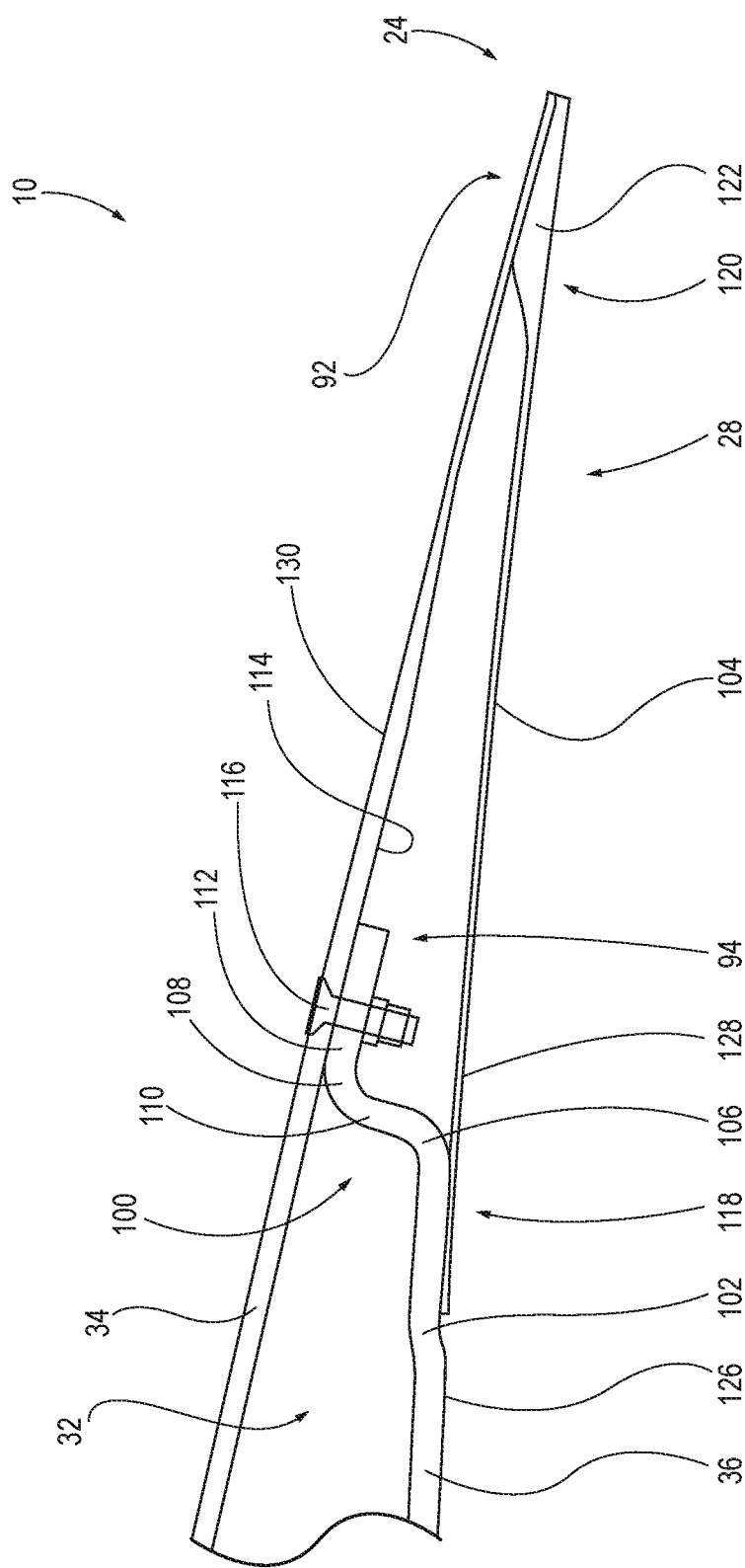
FIG. 3 is a side elevation view of an integral Z-spar formed in a lower skin panel.
Figure 4:
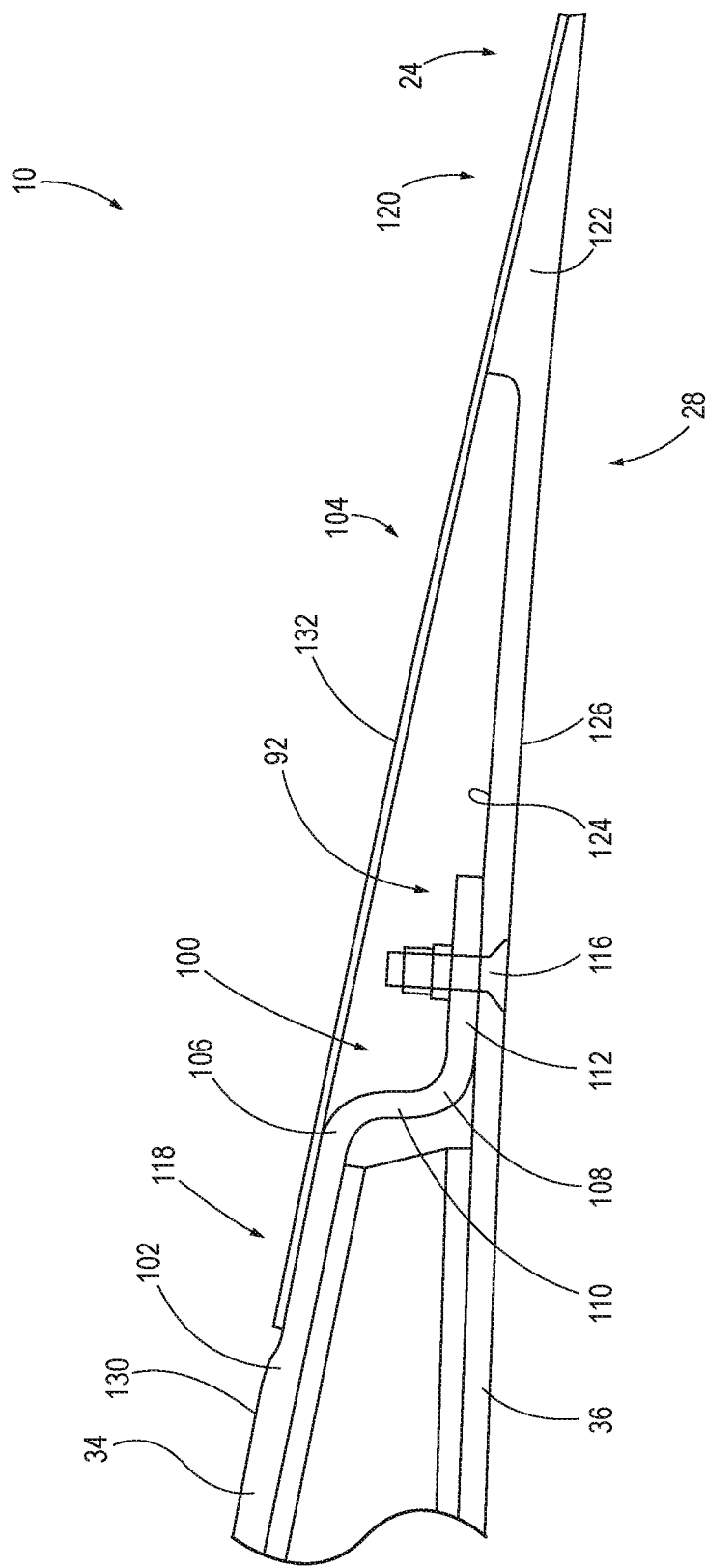
FIG. 4 is a side elevation view of an integral Z-spar formed in an upper skin panel.

Some examples of structural composite airfoil 10 include integral Z-spar 100, which may be a part of primary structural element 26, with elements aft of integral Z-spar 100 being part of secondary structural element 28 in some examples. Thus, positioning integral Z-spar 100 aft of middle C-channel spar 60 may lengthen, or extend, the length of primary structural element 26, and/or may increase the percentage of length 90 of structural composite airfoil 10 that corresponds to primary structural element 26. In some examples, integral Z-spar 100 may be formed within trailing edge region 32 of primary structural element 26. FIGS. 3-4 illustrate examples of such integral Z-spars 100, with FIG. 3 illustrating an example of integral Z-spar 100 formed in lower skin panel 36, and FIG. 4 illustrating an example of integral Z-spar 100 formed in upper skin panel 34. Integrating components such as integral Z-spar 100 into upper skin panel 34 and/or lower skin panel 36 in various examples of structural composite airfoil 10 may allow for a reduction in fasteners and/or overall part count. Integral Z-spar 100 is generally positioned adjacent trailing edge 24 of structural composite airfoil 10, such as by being positioned at least 80% of chord length 90 away from leading edge 22. In some examples, integral Z-spar 100 may be positioned between 80-95% of chord length 90 away from leading edge 22.

With reference to FIG. 3, integral Z-spar 100 may be formed in lower trailing edge end 94 of lower skin panel 36. Integral Z-spar 100 may include a first bend 106, a second bend 108, and a first Z-spar segment 110 extending between first bend 106 and second bend 108. In some examples, first Z-spar segment 110 may be at least substantially perpendicular to lower skin panel 36 and/or upper skin panel 34. In some examples, first Z-spar segment 110 may form an angle with lower skin panel 36 that is greater than 90 degrees, and/or greater than 100 degrees. Additionally or alternatively, first Z-spar segment 110 may form an angle with upper skin panel 34 that is greater than 90 degrees, and/or greater than 100 degrees. Integral Z-spar 100 may further include a second Z-spar segment 112 extending aft of second bend 108. Second Z-spar segment 112 may be coupled to upper skin panel 34, as shown in FIG. 3. In the example shown in FIG. 3, second Z-spar segment 112 is positioned adjacent an interior surface 114 of upper skin panel 34. A Z-spar fastener 116 may couple integral Z-spar 100 to upper skin panel 34. In some examples, Z-spar fastener 116 is recessed into upper skin panel 34 (e.g., such that Z-spar fastener 116 is at least substantially flush or sub-flush with an upper panel surface 130 of upper skin panel 34) and extends through upper skin panel 34 and second Z-spar segment 112 to couple integral Z-spar 100 to upper skin panel 34. In some examples, Z-spar fastener 116 may be accessible from both sides of upper skin panel 34, and thus is not a blind fastener in some examples. For example, Z-spar fastener 116 may be a regular Hi-Lok® fastener, a rivet, a lock bolt, or other fastener. Because Z-spar fastener 116 may be accessible from both sides, this may facilitate lower cost installations due to the ability to use simpler fasteners than in prior art examples.

Integral Z-spar 100 may include a Z-spar joggle 102 in lower skin panel 36 that may be configured to receive a portion of a trailing edge closeout cover 104, which may at least partially define secondary structural element 28 and/or trailing edge 24 of structural composite airfoil 10. Z-spar joggle 102 is effectively a small shift in lower skin panel 36 upwards toward upper skin panel 34, and generally is positioned forward of first bend 106. A first cover end region 118 of trailing edge closeout cover 104 may be bonded to lower skin panel 36, as shown in FIG. 3. Additionally or alternatively, first cover end region 118 may be riveted or otherwise fastened or coupled to lower skin panel 36. To create a smooth surface at the interface and improve aerodynamic performance, first cover end region 118 may be slightly recessed into lower skin panel 36, such as via Z-spar joggle 102, as shown in FIG. 3. Z-spar joggle 102 may be tailored to create a greater or smaller recess in lower skin panel 36, depending on the thickness of first cover end region 118, such that a lower panel surface 126 of lower skin panel 36 is substantially flush with a lower cover surface 128 of trailing edge closeout cover 104 within first cover end region 118. In other words, Z-spar joggle 102 may be larger to create a bigger recess to receive and engage with a given trailing edge closeout cover 104 having a thicker first cover end region 118, whereas Z-spar joggle 102 may be smaller to create a smaller recess to receive and engage with a different given trailing edge closeout cover 104 having a thinner first cover end region 118. Any gaps remaining at the interface of Z-spar joggle 102 and first cover end region 118 (or elsewhere on structural composite airfoil 10) may be filled with a sealant, a filler material, and/or a resin, and then smoothed.

A second cover end region 120 of trailing edge closeout cover 104 may include an integral wedge 122 that may be coupled (e.g., bonded and/or coupled via one or more fasteners) to upper skin panel 34, as shown in FIG. 3. Alternatively, integral wedge 122 may be integrally formed with upper skin panel 34. In still other examples, integral wedge 122 may be a discrete component separate from trailing edge closeout cover 104 and separate from upper skin panel 34, and which may be bonded or otherwise coupled to upper skin panel 34 and/or trailing edge closeout cover 104. As an example, integral wedge 122 may be formed by building up plies of material, molding, and/or by machining a mating face profile to mate with upper skin panel 34.

With reference to FIG. 4, integral Z-spar 100 may be formed in upper trailing edge end 92 of upper skin panel 34. In the example shown in FIG. 4, second Z-spar segment 112 is coupled to lower skin panel 36, and is positioned adjacent an interior surface 124 of lower skin panel 36. Z-spar fastener 116 couples integral Z-spar 100 to lower skin panel 36, with Z-spar fastener 116 being recessed into lower skin panel 36 (e.g., such that Z-spar fastener 116 is at least substantially flush or sub-flush with lower panel surface 126 of lower skin panel 36) and extending through lower skin panel 36 and second Z-spar segment 112 to couple integral Z-spar 100 to lower skin panel 36. In some examples, Z-spar fastener 116 may be accessible from both sides of lower skin panel 36, and thus is not a blind fastener in some examples. For example, Z-spar fastener 116 may be a regular Hi-Lok® fastener, a rivet, a lock bolt, or other fastener. Because Z-spar fastener 116 may be accessible from both sides, this may facilitate lower cost installations due to the ability to use simpler fasteners than in prior art examples.

In FIG. 4, integral Z-spar 100 includes Z-spar joggle 102 in upper skin panel 34 that is configured to receive a portion of trailing edge closeout cover 104, with Z-spar joggle 102 being positioned forward of first bend 106. Z-spar joggle 102 is effectively a small shift in upper skin panel 34 toward lower skin panel 36. First cover end region 118 of trailing edge closeout over 104 is bonded to upper skin panel 34 instead of lower skin panel 36 in this example. Additionally or alternatively, first cover end region 118 may be riveted or otherwise fastened or coupled to upper skin panel 34. To create a smooth surface at the interface and improve aerodynamic performance, first cover end region 118 may be slightly recessed into upper skin panel 34, such as via Z-spar joggle 102, as shown in FIG. 4. Z-spar joggle 102 may be tailored to create a greater or smaller recess in upper skin panel 34, depending on the thickness of first cover end region 118, such that an upper panel surface 130 of upper skin panel 34 is substantially flush with an upper cover surface 132 of trailing edge closeout cover 104 within first cover end region 118. In other words, Z-spar joggle 102 may be larger to create a bigger recess to receive and engage with a given trailing edge closeout cover 104 having a thicker first cover end region 118, whereas Z-spar joggle 102 may be smaller to create a smaller recess to receive and engage with a different given trailing edge closeout cover 104 having a thinner first cover end region 118.

Second cover end region 120 of trailing edge closeout cover 104 may include integral wedge 122 that may be coupled (e.g., bonded and/or coupled via one or more fasteners) to lower skin panel 36. Alternatively, and as shown in FIG. 4, integral wedge 122 may be integrally formed with lower skin panel 36. In still other examples, integral wedge 122 may be a discrete component separate from trailing edge closeout cover 104 and separate from lower skin panel 36, and which may be bonded or otherwise coupled to lower skin panel 36 and/or trailing edge closeout cover 104. Integral wedge 122 may be formed, for example, by building up plies of material, molding, and/or by machining a mating face profile to mate with lower skin panel 36.

Figure 5:
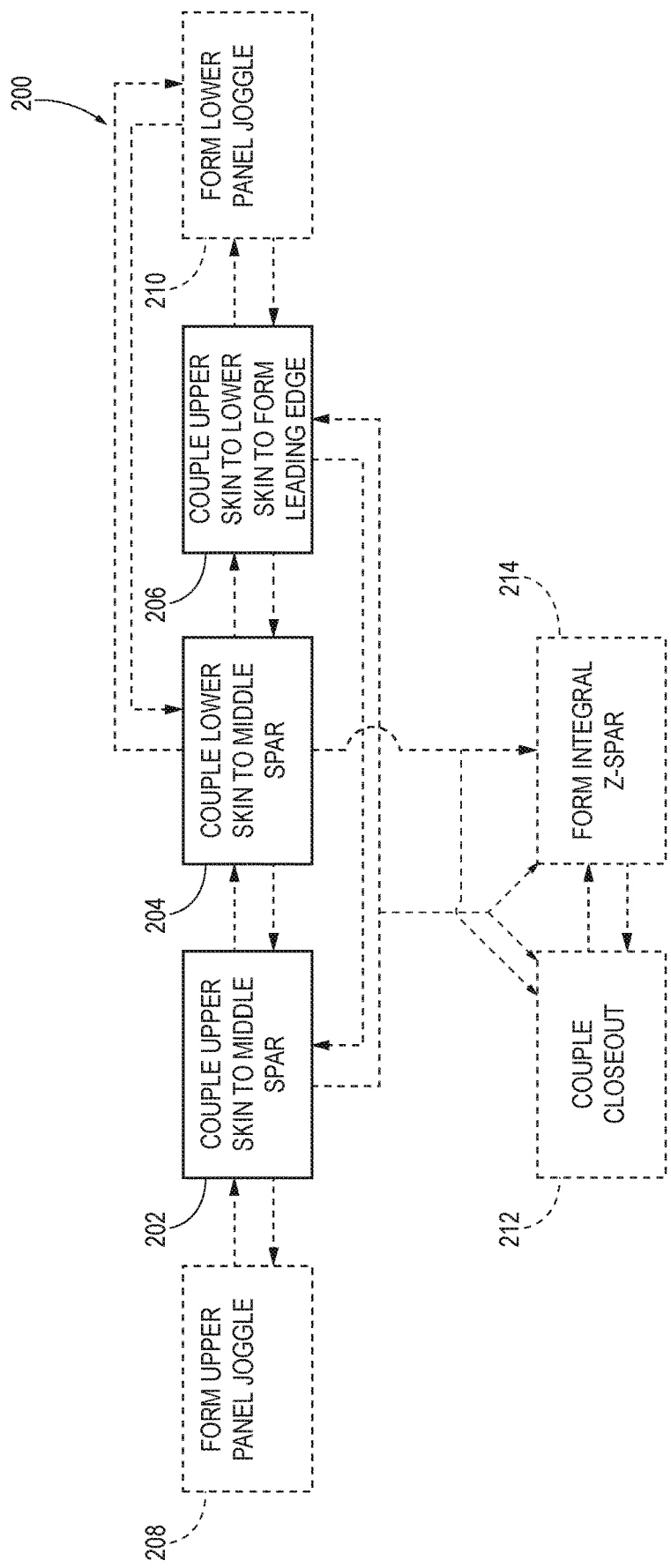
FIG. 5 is a flowchart diagram representing disclosed methods of forming disclosed structural composite airfoils.

FIG. 5 schematically provides a flowchart that represents illustrative, non-exclusive examples of methods 200 according to the present disclosure. In FIG. 5, some steps are illustrated in dashed boxes indicating that such steps may be optional or may correspond to an optional version of a method according to the present disclosure. That said, not all methods 200 according to the present disclosure are required to include the steps illustrated in solid boxes. The methods 200 and steps illustrated in FIG. 5 are not limiting and other methods and steps are within the scope of the present disclosure, including methods having greater than or fewer than the number of steps illustrated, as understood from the discussions herein.

Methods 200 generally include coupling an upper skin panel (e.g., upper skin panel 34) to a middle C-channel spar (e.g., middle C-channel spar 60), at 202, and coupling a lower skin panel (e.g., lower skin panel 36) to the middle C-channel spar, at 204. Coupling the upper skin panel to the middle C-channel spar at 202 generally includes coupling the upper skin panel to an upper flange (e.g., upper flange 66) of the middle C-channel spar. Similarly, coupling the lower skin panel to the middle C-channel spar at 204 generally includes coupling the lower skin panel to a lower flange (e.g., lower flange 68) of the middle C-channel spar. Coupling the upper skin panel to the middle C-channel spar at 202 and coupling the lower skin panel to the middle C-channel spar at 204 may include positioning the middle C-channel spar such that an internal volume (e.g., internal volume 40) is effectively separated into a forward internal volume (e.g., forward internal volume 42) and an aft internal volume (e.g., aft internal volume 44), with a first volume of the forward internal volume being within 10% of a second volume of the aft internal volume, in some examples.

Methods 200 also include coupling the upper skin panel to the lower skin panel at 206, which includes coupling a lower leading edge end of the lower skin panel (e.g., lower leading edge end 78) to an upper leading edge end of the upper skin panel (e.g., upper leading edge end 76). Coupling the upper leading edge end to the lower leading edge end at 206 is performed such that the leading edge of the structural composite airfoil (e.g., leading edge 22) is defined, or formed, by the upper skin panel and the lower skin panel themselves. Coupling the lower leading edge end to the upper leading edge end at 206 is performed such that the lower leading edge end is coupled to the upper leading edge end forward of the middle C-channel spar. Additionally or alternatively, coupling the lower leading edge end to the upper leading edge end at 206 may include overlapping a portion of the upper skin panel adjacent the upper leading edge end with a portion of the lower skin panel adjacent the lower leading edge end.

Some methods 200 further include coupling a closeout (e.g., trailing edge closeout cover 104) to the upper skin panel and the lower skin panel, at 212. Additionally or alternatively, methods 200 may include forming an integral Z-spar in the lower skin panel or upper skin panel, at 214. Forming the integral Z-spar at 214 may include coupling the integral Z-spar to the lower skin panel (e.g., when the integral Z-spar is formed in the upper skin panel), or may include coupling the integral Z-spar to the upper skin panel (e.g., when the integral Z-spar is formed in the lower skin panel). Some methods 200 include forming an upper panel joggle adjacent or within the upper leading edge end, wherein the upper panel joggle is configured to receive the lower leading edge end when the upper skin panel is coupled to the lower skin panel. Some methods 200 include forming a lower panel joggle (e.g., lower panel joggle 54) adjacent or within the lower leading edge end, at 210, wherein the lower panel joggle is configured to receive the upper leading edge end when the upper skin panel is coupled to the lower skin panel. Additionally or alternatively, methods 200 may include forming an upper panel joggle adjacent or within the upper leading edge end, at 208, wherein the upper panel joggle is configured to receive the lower leading edge end when the upper skin panel is coupled to the lower skin panel.

Illustrative, non-exclusive examples of inventive subject matter according to the present disclosure are described in the following enumerated paragraphs:

A1. A structural composite airfoil (10) having a leading edge (22) and a trailing edge (24), the structural composite airfoil (10) comprising:

a primary structural element (26) extending from a leading edge region (30) to a trailing edge region (32), wherein the leading edge region (30) of the primary structural element (26) forms the leading edge (22) of the structural composite airfoil (10), wherein the primary structural element (26) comprises:

an upper skin panel (34) extending from an upper leading edge end (76) to an upper trailing edge end (92);

a lower skin panel (36) extending from a lower leading edge end (78) to a lower trailing edge end (94);

an internal volume (40) defined between the upper skin panel (34) and the lower skin panel (36); and a middle C-channel spar (60) comprising an upper flange (66) coupled to the upper skin panel (34), wherein the middle C-channel spar (60) further comprises a lower flange (68) coupled to the lower skin panel (36), wherein the lower leading edge end (78) of the lower skin panel (36) is coupled to the upper leading edge end (76) of the upper skin panel (34) within the leading edge region (30) of the primary structural element (26); and a secondary structural element (28) defining the trailing edge (24) of the structural composite airfoil (10).

A2. The structural composite airfoil (10) of paragraph A1, wherein the middle C-channel spar (60) faces the leading edge (22) of the structural composite airfoil (10).

A3. The structural composite airfoil (10) of any of paragraphs A1-A2, wherein the upper leading edge end (76) overlaps the lower leading edge end (78).

A4. The structural composite airfoil (10) of any of paragraphs A1-A3, wherein the upper leading edge end (76) comprises an upper panel joggle configured to receive the lower leading edge end (78).

A5. The structural composite airfoil (10) of any of paragraphs A1-A4, wherein the lower leading edge end (78) comprises a lower panel joggle (54) configured to receive the upper leading edge end (76).

A6. The structural composite airfoil (10) of any of paragraphs A1-A5, further comprising a sealant configured to smooth the leading edge (22) of the structural composite airfoil (10) where the upper leading edge end (76) is coupled to the lower leading edge end (78).

A7. The structural composite airfoil (10) of any of paragraphs A1-A6, further comprising a leading edge fastener (80) configured to couple the upper leading edge end (76) to the lower leading edge end (78).

A8. The structural composite airfoil (10) of paragraph A7, wherein the leading edge fastener (80) is countersunk in the upper leading edge end (76) to such that it is flush with the upper skin panel (34).

A9. The structural composite airfoil (10) of paragraph A7, wherein the leading edge fastener (80) is countersunk in the lower leading edge end (78) to such that it is flush with the lower skin panel (36).

A10. The structural composite airfoil (10) of any of paragraphs A1-A9, wherein the structural composite airfoil (10) does not include a front C-channel spar.

A11. The structural composite airfoil (10) of any of paragraphs A1-A10, wherein the structural composite airfoil (10) comprises an upper airfoil surface (70) and a lower airfoil surface (72).

A12. The structural composite airfoil (10) of paragraph A11, wherein the upper airfoil surface (70) is defined by the upper skin panel (34).

A13. The structural composite airfoil (10) of paragraph A11 or A12, wherein the lower airfoil surface (72) is defined by the lower skin panel (36).

A14. The structural composite airfoil (10) of any of paragraphs A1-A13, wherein the upper skin panel (34) is continuous from the upper leading edge end (76) to the upper trailing edge end (92).

A15. The structural composite airfoil (10) of any of paragraphs A1-A14, wherein the lower skin panel (36) is continuous from the lower leading edge end (78) to the lower trailing edge end (94).

A16. The structural composite airfoil (10) of any of paragraphs A1-A15, wherein the lower trailing edge end (94) is coupled to the upper skin panel (34).

A17. The structural composite airfoil (10) of any of paragraphs A1-A16, wherein the lower skin panel (36) comprises an integral Z-spar (100) at the lower trailing edge end (94).

A18. The structural composite airfoil (10) of any of paragraphs A1-A17, wherein the primary structural element (26) comprises an/the integral Z-spar (100).

A19. The structural composite airfoil (10) of paragraph A17 or A18, wherein the integral Z-spar (100) is formed by the lower skin panel (36) within the trailing edge region (32) of the primary structural element (26).

A20. The structural composite airfoil (10) of any of paragraphs A17-A19, wherein the integral Z-spar (100) comprises a joggle configured to receive a portion of the secondary structural element (28).

A21. The structural composite airfoil (10) of any of paragraphs A17-A20, wherein the integral Z-spar (100) comprises a first bend (106), a second bend (108), and a first Z-spar segment (110) extending between the first bend (106) and the second bend (108).

A22. The structural composite airfoil (10) of paragraph A21, wherein the first Z-spar segment (110) is substantially perpendicular to the lower skin panel (36) and/or substantially perpendicular to the upper skin panel (34).

A23. The structural composite airfoil (10) of paragraph A21 or A22, wherein the integral Z-spar (100) further comprises a second Z-spar segment (112) extending aft of the second bend (108), wherein the second Z-spar segment (112) is coupled to the upper skin panel (34).

A24. The structural composite airfoil (10) of paragraph A23, wherein the second Z-spar segment (112) is adjacent an interior surface (114) of the upper skin panel (34).

A25. The structural composite airfoil (10) of paragraph A23 or A24, wherein the second Z-spar segment (112) is coupled to the upper skin panel (34) via a Z-spar fastener (116), wherein the Z-spar fastener (116) is recessed into the upper skin panel (34), and wherein the Z-spar fastener (116) extends through the second Z-spar segment (112).

A25.1. The structural composite airfoil (10) of paragraph A25, wherein the Z-spar fastener (116) is not blind.

A25.2. The structural composite airfoil (10) of paragraph A25 or A25.1, wherein the Z-spar fastener (116) comprises a Hi-Lok® fastener, a rivet, and/or a lock bolt.

A26. The structural composite airfoil (10) of any of paragraphs A27-A25.2, wherein a/the joggle of the integral Z-spar (100) is forward of the first bend (106).

A27. The structural composite airfoil (10) of any of paragraphs A1-A26, wherein the structural composite airfoil (10) has a chord length (90), and wherein a position along the chord length (90) may be defined by a percentage of the distance along the chord length (90) from the leading edge (22).

A28. The structural composite airfoil (10) of paragraph A27, wherein the middle C-channel spar (60) is positioned between 30%-60% of the chord length (90) away from the leading edge (22), and/or between 35-45% of the chord length (90) away from the leading edge (22).

A29. The structural composite airfoil (10) of paragraph A28, wherein the middle C-channel spar (60) is positioned at about 40% of the chord length (90) away from the leading edge (22).

A30. The structural composite airfoil (10) of any of paragraphs A27-A29, wherein an/the integral Z-spar (100) is positioned between 80-95% of the chord length (90) away from the leading edge (22).

A31. The structural composite airfoil (10) of any of paragraphs A1-A30, further comprising a first fastener (88) coupling the upper skin panel (34) to the upper flange (66) of the middle C-channel spar (60).

A32. The structural composite airfoil (10) of any of paragraphs A1-A31 further comprising a second fastener (88) coupling the lower skin panel (36) to the lower flange (68) of the middle C-channel spar (60).

A33. The structural composite airfoil (10) of any of paragraphs A1-A32, wherein at least a portion of the upper skin panel (34) is core stiffened.

A34. The structural composite airfoil (10) of paragraph A33, wherein the upper skin panel (34) comprises a first upper core stiffened portion (134) positioned between the upper leading edge end (76) and the middle C-channel spar (60), and wherein the upper skin panel (34) further comprises a second upper core stiffened portion (136) positioned between the middle C-channel spar (60) and the upper trailing edge end (92).

A34.1. The structural composite airfoil (10) of paragraph A34, wherein the first upper core stiffened portion (134) extends to a location adjacent the upper leading edge end (76).

A34.2. The structural composite airfoil (10) of paragraph A34 or A34.1, wherein the first upper core stiffened portion (134) is configured to at least partially define a shape of the leading edge (22) of the structural composite airfoil (10).

A35. The structural composite airfoil (10) of any of paragraphs A1-A34.2, wherein at least a portion of the lower skin panel (36) is core stiffened.

A35.1. The structural composite airfoil (10) of paragraph A35, wherein the lower skin panel (36) comprises a first lower core stiffened portion (140) positioned between the lower leading edge end (78) and the middle C-channel spar (60), and wherein the lower skin panel (36) further comprises a second lower core stiffened portion (142) positioned between the middle C-channel spar (60) and the lower trailing edge end (94).

A35.2. The structural composite airfoil (10) of paragraph A35.1, wherein the first lower core stiffened portion (140) extends to a location adjacent the lower leading edge end (78).

A35.3. The structural composite airfoil (10) of paragraph A35.1 or A35.2, wherein the first lower core stiffened portion (140) is configured to at least partially define a shape of the leading edge (22) of the structural composite airfoil (10).

A36. The structural composite airfoil (10) of any of paragraphs A1-A35.3, wherein the upper skin panel (34) comprises fiberglass or carbon fiber.

A37. The structural composite airfoil (10) of any of paragraphs A1-A36, wherein the lower skin panel (36) comprises fiberglass or carbon fiber.

A38. The structural composite airfoil (10) of any of paragraphs A1-A37, wherein the structural composite airfoil

(10) is a trailing edge flap (17), an aileron, a flaperon, an air brake, an elevator, a slat, a spoiler, a canard, a rudder, and/or a winglet.

A39. The structural composite airfoil (10) of any of paragraphs A1-A38, wherein the secondary structural element (28) comprises a wedge closeout.

A40. The structural composite airfoil (10) of any of paragraphs A1-A39, wherein the secondary structural element (28) comprises a duckbill closeout.

A41. The structural composite airfoil (10) of any of paragraphs A1-A40, wherein the secondary structural element (28) comprises a bonded closeout.

A42. The structural composite airfoil (10) of any of paragraphs A1-A41, wherein the secondary structural element (28) comprises a riveted closeout.

A43. The structural composite airfoil (10) of any of paragraphs A1-A42, wherein the lower trailing edge end (94) of the lower skin panel (36) end is coupled to the upper skin panel (34).

A44. The structural composite airfoil (10) of any of paragraphs A1-A43, wherein the upper trailing edge end (92) of the upper skin panel (34) is coupled to the secondary structural element (28).

A45. The structural composite airfoil (10) of any of paragraphs A1-A44, wherein the middle C-channel spar (60) effectively separates the internal volume (40) into a forward internal volume (42) and an aft internal volume (44), wherein the forward internal volume (42) is forward of the middle C-channel spar (60), and wherein the aft internal volume (44) is aft of the middle C-channel spar (60).

A46. The structural composite airfoil (10) of paragraph A45, wherein the middle C-channel spar (60) is positioned such that a first volume of the forward internal volume (42) is within 10% of a second volume of the aft internal volume (44).

A47. The structural composite airfoil (10) of any of paragraphs A1-A46, wherein the upper skin panel (34) is coupled to the lower skin panel (36) without the use of any splice straps.

B1. An aircraft (14) comprising the structural composite airfoil (10) of any of paragraphs A1-A47.

B2. A trailing edge flap (17) for an aircraft (14) comprising the structural composite airfoil (10) of any of paragraphs A1-A47.

C1. A method (200) of assembling a structural composite airfoil (10), the method (200) comprising:

coupling (202) an upper skin panel (34) to a middle C-channel spar (60), wherein the structural composite airfoil (10) extends from a leading edge (22) to a trailing edge (24), wherein the middle C-channel spar (60) comprises an upper flange (66), a lower flange (68), and an elongated span extending between the upper flange (66) and the lower flange (68), wherein the coupling (202) the upper skin panel (34) to the middle C-channel spar (60) comprises coupling the upper skin panel (34) to the upper flange (66) of the front C-channel spar, and wherein the upper skin panel (34) extends from an upper leading edge end (76) to an upper trailing edge end (92);

coupling (204) a lower skin panel (36) to the middle C-channel spar (60) such that an internal volume (40) is defined between the upper skin panel (34) and the lower skin panel (36), wherein the upper skin panel (34), the lower skin panel (36), and the middle C-channel spar (60) together form at least a portion of a primary structural element (26) of the structural composite airfoil (10), and wherein the lower skin panel (36) extends from a lower leading edge end (78) to a lower trailing edge end (94); and coupling (206) the lower leading edge end (78) of the lower skin panel (36) to the upper leading edge end (76) of the upper skin panel (34) to form the leading edge (22) of the structural composite airfoil (10).

C2. The method (200) of paragraph C1, wherein the coupling (206) the lower leading edge end (78) to the upper leading edge end (76) comprises coupling the lower leading edge end (78) to the upper leading edge end (76) forward of the middle C-channel spar (60).

C3. The method (200) of any of paragraphs C1-C2, wherein the structural composite airfoil (10) is the structural composite airfoil (10) of any of paragraphs A1-A47.

C4. The method (200) of any of paragraphs C1-C3, further comprising coupling (212) a/the closeout to the upper skin panel (34) and the lower skin panel (36), wherein the closeout defines the trailing edge (24) of the structural composite airfoil (10).

C5. The method (200) of any of paragraphs C1-C4, further comprising forming (214) an/the integral Z-spar (100) in the lower skin panel (36).

C6. The method (200) of paragraph C5, further comprising coupling the integral Z-spar (100) to the upper skin panel (34).

C7. The method (200) of any of paragraphs C1-C6, further comprising forming (208) an upper panel joggle adjacent or within the upper leading edge end (76), wherein the upper panel joggle is configured to receive the lower leading edge end (78).

C8. The method (200) of any of paragraphs C1-C7, further comprising forming (210) a lower panel joggle (54) adjacent or within the lower leading edge end (78), wherein the lower panel joggle (54) is configured to receive the upper leading edge end (76).

C9. The method (200) of any of paragraphs C1-C8, wherein the coupling (206) the lower leading edge end (78) of the lower skin panel (36) to the upper leading edge end (76) of the upper skin panel (34) comprises overlapping a portion of the upper skin panel (34) adjacent the upper leading edge end (76) with a portion of the lower skin panel (36) adjacent the lower leading edge end (78).

C10. The method (200) of any of paragraphs C1-C9, further comprising positioning the middle C-channel spar (60) such that the internal volume (40) is effectively separated into a/the forward internal volume (42) and an/the aft internal volume (44), and wherein a/the first volume of the forward internal volume (42) is within 10% of a/the second volume of the aft internal volume (44).

D1. The use of the structural composite airfoil (10) of any of paragraphs A1-A47 as an inboard flap (17) for an aircraft (14).

D2. The use of the structural composite airfoil (10) of any of paragraphs A1-A47 as an outboard flap (17) for an aircraft (14).

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, or A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A structural composite airfoil having a leading edge and a trailing edge, the structural composite airfoil comprising:
    a primary structural element extending from a leading edge region to a trailing edge region, wherein the leading edge region of the primary structural element forms the leading edge of the structural composite airfoil, wherein the primary structural element comprises:
        an upper skin panel extending from an upper leading edge end to an upper trailing edge end;
        a lower skin panel extending from a lower leading edge end to a lower trailing edge end;
        an internal volume defined between the upper skin panel and the lower skin panel; and
        a middle C-channel spar comprising an upper flange coupled to the upper skin panel, wherein the middle C-channel spar further comprises a lower flange coupled to the lower skin panel, wherein the lower leading edge end of the lower skin panel is coupled to the upper leading edge end of the upper skin panel within the leading edge region of the primary structural element, wherein the structural composite airfoil has a chord length, wherein a position along the chord length is defined by a percentage of a distance along the chord length from the leading edge, and wherein the primary structural element is free from any spar within the leading edge region, the leading edge region being between 0% and 35% of the chord length away from the leading edge; and
    a secondary structural element defining the trailing edge of the structural composite airfoil.

2. The structural composite airfoil according to claim 1, wherein the upper leading edge end overlaps the lower leading edge end.

3. The structural composite airfoil according to claim 1, wherein the upper leading edge end comprises an upper panel joggle configured to receive the lower leading edge end.

4. The structural composite airfoil according to claim 1, wherein the lower leading edge end comprises a lower panel joggle configured to receive the upper leading edge end.

5. The structural composite airfoil according to claim 1, further comprising a leading edge fastener configured to couple the upper leading edge end to the lower leading edge end.

6. The structural composite airfoil according to claim 5, wherein the leading edge fastener is countersunk in the upper leading edge end such that it is flush with the upper skin panel.

7. The structural composite airfoil according to claim 5, wherein the leading edge fastener is countersunk in the lower leading edge end such that it is flush with the lower skin panel.

8. The structural composite airfoil according to claim 1, wherein the lower skin panel comprises an integral Z-spar at the lower trailing edge end.

9. The structural composite airfoil according to claim 1, wherein the middle C-channel spar is positioned between 35-45% of the chord length away from the leading edge.

10. The structural composite airfoil according to claim 1, wherein at least a portion of the upper skin panel comprises a core stiffened material.

11. The structural composite airfoil according to claim 10, wherein the upper skin panel comprises a first upper core stiffened portion positioned between the upper leading edge end and the middle C-channel spar, wherein the upper skin panel further comprises a second upper core stiffened portion positioned between the middle C-channel spar and the upper trailing edge end, and wherein the first upper core stiffened portion is configured to at least partially define a shape of the leading edge of the structural composite airfoil.

12. The structural composite airfoil according to claim 11, wherein at least a portion of the lower skin panel comprises a second core stiffened material.

13. The structural composite airfoil according to claim 12, wherein the lower skin panel comprises a first lower core stiffened portion positioned between the lower leading edge end and the middle C-channel spar, wherein the lower skin panel further comprises a second lower core stiffened portion positioned between the middle C-channel spar and the lower trailing edge end, and wherein the first lower core stiffened portion is configured to at least partially define a shape of the leading edge of the structural composite airfoil.

14. The structural composite airfoil according to claim 1, wherein the secondary structural element comprises a bonded closeout.

15. The structural composite airfoil according to claim 1, wherein the middle C-channel spar effectively separates the internal volume into a forward internal volume and an aft internal volume, wherein the forward internal volume is forward of the middle C-channel spar, and wherein the aft internal volume is aft of the middle C-channel spar.

16. The structural composite airfoil according to claim 15, wherein the middle C-channel spar is positioned such that a first volume of the forward internal volume is within 10% of a second volume of the aft internal volume.

17. An aircraft comprising the structural composite airfoil according to claim 1.

18. A trailing edge flap for an aircraft comprising the structural composite airfoil according to claim 1.

19. A method of assembling a structural composite airfoil, the method comprising:

coupling an upper skin panel to a middle C-channel spar, wherein the structural composite airfoil extends from a leading edge to a trailing edge, wherein the middle C-channel spar comprises an upper flange, a lower flange, and an elongated span extending between the upper flange and the lower flange, wherein the coupling the upper skin panel to the middle C-channel spar comprises coupling the upper skin panel to the upper flange of a front C-channel spar, and wherein the upper skin panel extends from an upper leading edge end to an upper trailing edge end;

coupling a lower skin panel to the middle C-channel spar such that an internal volume is defined between the upper skin panel and the lower skin panel, wherein the upper skin panel, the lower skin panel, and the middle C-channel spar together form at least a portion of a primary structural element of the structural composite airfoil, wherein the primary structural element extends from a leading edge region to a trailing edge region, wherein the leading edge region of the primary structural element forms the leading edge of the structural composite airfoil, and wherein the lower skin panel extends from a lower leading edge end to a lower trailing edge end; and coupling the lower leading edge end of the lower skin panel to the upper leading edge end of the upper skin panel within the leading edge region of the primary structural element, thereby forming the leading edge of the structural composite airfoil, wherein the primary structural element is free from any spar within the leading edge region of the primary structural element.

20. The method according to claim 19, further comprising forming a lower panel joggle adjacent or within the lower leading edge end, wherein the lower panel joggle is configured to receive the upper leading edge end, and wherein the coupling the lower leading edge end of the lower skin panel to the upper leading edge end of the upper skin panel comprises overlapping a portion of the upper skin panel adjacent the upper leading edge end with and a portion of the lower skin panel adjacent the lower leading edge end.

* * * * *

UNITED STATES PATENT AND TRADEMARK OFFICE
CERTIFICATE OF CORRECTION

PATENT NO. : 11,572,152 B2
APPLICATION NO. : 16/880044
DATED : February 7, 2023
INVENTOR(S) : Reinhart et al.

It is certified that error appears in the above-identified patent and that said Letters Patent is hereby corrected as shown below:

In the Claims

Please replace the text at Column 20, Lines 33-41, with the text below:
20. The method according to claim 19, further comprising forming a lower panel joggle adjacent or within the lower leading edge end, wherein the lower panel joggle is configured to receive the upper leading edge end, and wherein the coupling the lower leading edge end of the lower skin panel to the upper leading edge end of the upper skin panel comprises overlapping a portion of the upper skin panel adjacent the upper leading edge end with a portion of the lower skin panel adjacent the lower leading edge end.

Signed and Sealed this
Twenty-third Day of May, 2023

Katherine Kelly Vidal
*Director of the United States Patent and Trademark Office*